US012537114B2

(12) United States Patent
Mutnury et al.

(10) Patent No.: US 12,537,114 B2
(45) Date of Patent: Jan. 27, 2026

(54) CABLING SYSTEM FOR AN INFORMATION HANDLING SYSTEM

(71) Applicant: Dell Products L.P., Round Rock, TX (US)

(72) Inventors: Bhyrav M. Mutnury, Round Rock, TX (US); Raymond Dewine Heistand, II, Round Rock, TX (US); Sandor Tibor Farkas, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 200 days.

(21) Appl. No.: 18/418,672

(22) Filed: Jan. 22, 2024

(65) Prior Publication Data

US 2025/0239381 A1 Jul. 24, 2025

(51) Int. Cl.
*H01B 7/02* (2006.01)
*G06F 1/18* (2006.01)

(52) U.S. Cl.
CPC ................. *H01B 7/02* (2013.01); *G06F 1/18* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,010,788 | A * | 1/2000 | Kebabjian | H01B 11/002 174/105 R |
| 7,098,405 | B2 * | 8/2006 | Glew | H01B 11/04 174/113 AS |
| 10,424,420 | B1 * | 9/2019 | Farkas | H01B 13/06 |
| 10,643,766 | B1 * | 5/2020 | Farkas | H01B 11/1091 |
| 11,915,839 | B2 * | 2/2024 | Farkas | H01B 7/0291 |
| 2004/0149483 | A1 * | 8/2004 | Glew | G02B 6/4431 174/113 C |
| 2007/0151745 | A1 * | 7/2007 | Glew | H01B 11/04 174/113 C |
| 2010/0206609 | A1 * | 8/2010 | Glew | H01B 3/445 174/103 |
| 2014/0205249 | A1 * | 7/2014 | Glew | C08F 114/22 385/101 |
| 2020/0126693 | A1 * | 4/2020 | Farkas | H01B 11/1091 |
| 2023/0238157 | A1 * | 7/2023 | Farkas | H01B 11/1895 174/70 R |
| 2025/0239381 | A1 * | 7/2025 | Mutnury | H01B 7/02 |
| 2025/0239384 | A1 * | 7/2025 | Mutnury | H01B 7/0807 |

* cited by examiner

*Primary Examiner* — Lisa Lea-Edmonds
(74) *Attorney, Agent, or Firm* — McDermott Will & Schulte LLP

(57) ABSTRACT

A cabling system, including a preform, including a divider; a cable, including: a first conductor, a first dielectric material surrounding the first conductor, a second conductor, and a second dielectric material surrounding the second conductor, wherein the first dielectric material is coupled to the second dielectric material, wherein the cable is at least partially coupled to the preform such that the divider is positioned between the first dielectric material and the second dielectric material.

20 Claims, 6 Drawing Sheets

CABLING SYSTEM FOR AN INFORMATION HANDLING SYSTEM

BACKGROUND

Field of the Disclosure

The disclosure relates generally to an information handling system, and in particular, a cabling system for the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Cables have become an integral part of information handling systems, include servers. Within a rack, across multiple racks, and across multiple servers (within a rack), communication is accomplished through cables. The cables can further connect one or more PCBs. Cables provide a lower loss mode for signal propagation compared to PCBs.

SUMMARY

Innovative aspects of the subject matter described in this specification may be embodied in a cabling system, including a preform, including a divider; a cable, including: a first conductor; a first dielectric material surrounding the first conductor; a second conductor; and a second dielectric material surrounding the second conductor; wherein the first dielectric material is coupled to the second dielectric material, wherein the cable is at least partially coupled to the preform such that the divider is positioned between the first dielectric material and the second dielectric material.

Other embodiments of these aspects include corresponding systems and apparatus.

These and other embodiments may each optionally include one or more of the following features. For instance, the preform is cylindrical. The divider is positioned on an outer surface of the preform. The divider includes a first member extending at an angle from the outer surface of the preform; and a second member extending at the angle from the outer surface of the preform, wherein the first member is coupled to the second member at a ridge. The divider defines a distance between the first conductor and the second conductor. The angle defines the distance between the first conductor and the second conductor. The cable further includes: a first conductive material coupled to a portion of a first outer surface of the first dielectric material; and a second conductive material coupled to a portion of a second outer surface of the second dielectric material. The second conductive material is coupled to the portion of the second outer surface of the second dielectric material opposite to the portion of the first outer surface of the first dielectric material that the first conductive material is coupled to. The first conductive material and the second conductive material are conductive foil. The first conductive material and the second conductive material are conductive paint.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

Figure 1:
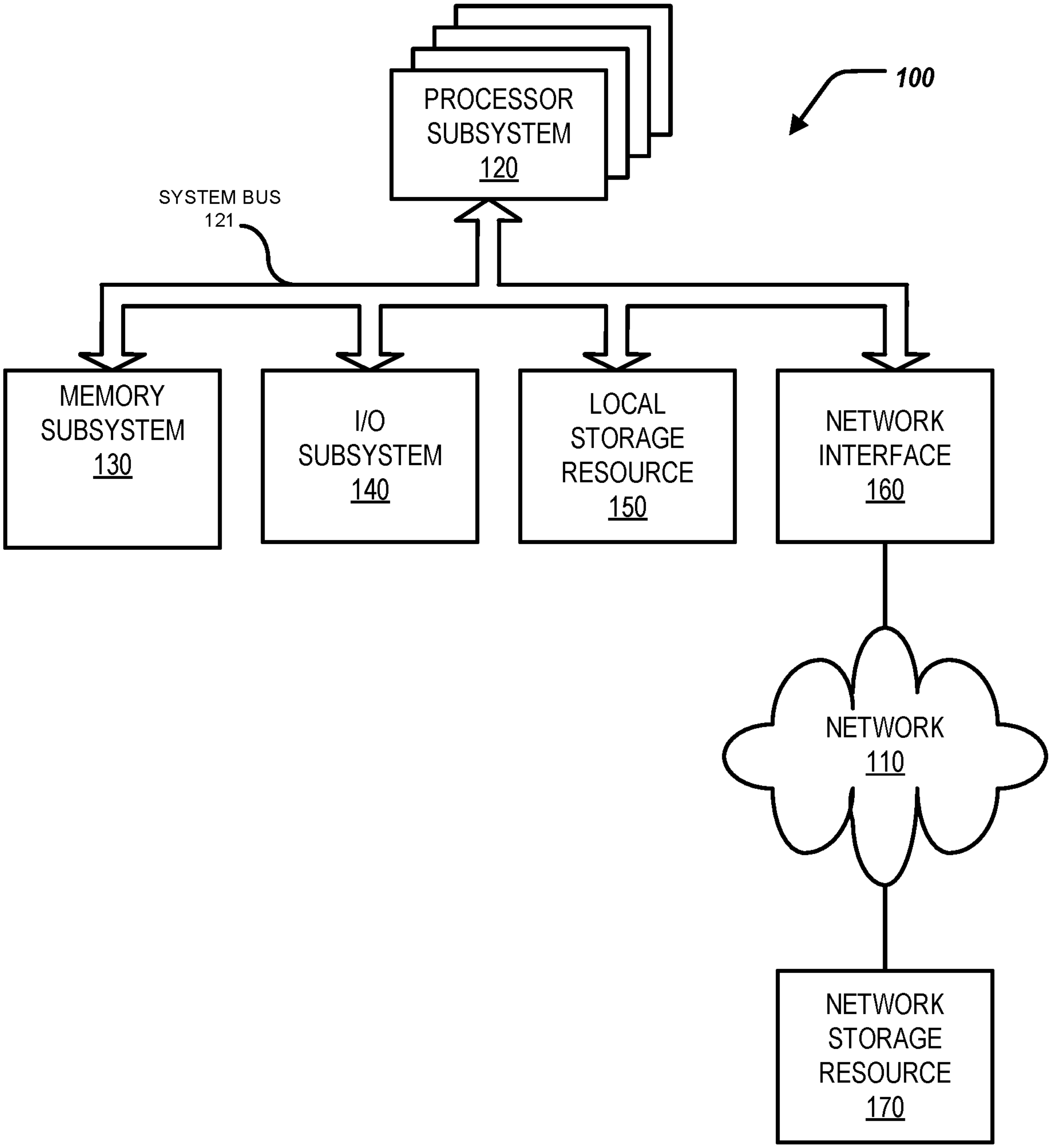
FIG. 1 is a block diagram of selected elements of an embodiment of an information handling system.

This disclosure discusses a cabling system of an information handling system. In short, a cable can be bent such that the dielectric material of the cable is compressed. To compensate for an impedance drop of the cable when the cable is compressed, the cable is coupled to a preform such that a divider of the preform is positioned between dielectric materials of the cable to increase the distance between conductors of the cable. When the distance between the conductors is increased, the impedance of the cable is increased, compensating for the drop in impedance when the cable is compressed, described further herein.

Specifically, this disclosure discusses a cabling system, including a preform, including a divider; a cable, including: a first conductor; a first dielectric material surrounding the first conductor; a second conductor; and a second dielectric material surrounding the second conductor; wherein the first dielectric material is coupled to the second dielectric material, wherein the cable is at partially coupled to the preform such that the divider is positioned between the first dielectric material and the second dielectric material.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
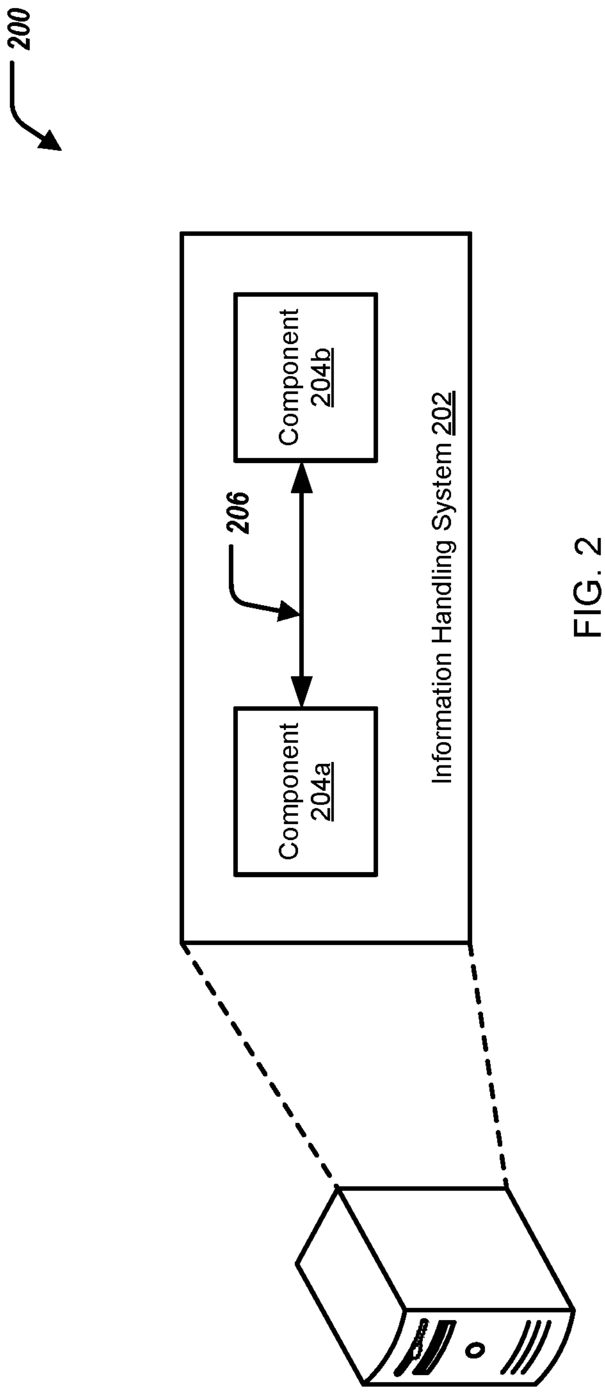
FIG. 2 illustrates a block diagram of an information handling system including a cable.

Turning to FIG. 2, FIG. 2 illustrates an environment 200 including an information handling system 202. The information handling system 202 can include computing components 204*a*, 204*b* (collectively referred to as computing components 204) and a cable 206. In some examples, the information handling system 202 is similar to, or includes, the information handling system 100 of FIG. 1. In some examples, the computing components 204 may include a processor, a volatile memory medium, a nonvolatile memory medium, an I/O subsystem, a network interface, a PCB, and an expansion card (e.g., a host bus adapter, a video card, a network adapter card, etc.), among others. The cable 206 can communicatively couple the computing component 204*a* to the computing component 204*b*.

Figure 3:
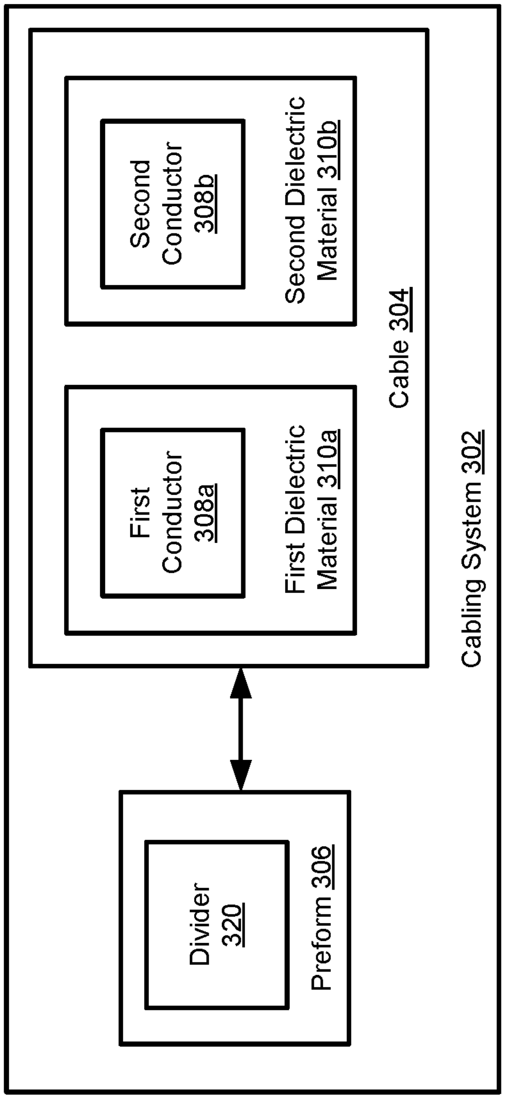
FIG. 3 illustrates a block diagram of a cabling system.

FIG. 3 illustrates a block diagram of a cabling system 302. The cabling system 302 can include a cable 304 and a preform 306. The cable 304 can include a first conductor 308*a*, a second conductor 308*b*, a first dielectric material 310*a*, and a second dielectric material 310*b*. The first conductor 308*a* and the second conductor 308*b* can collectively be referred to as conductors 308; and the first dielectric material 310*a* and the second dielectric material 310*b* can collectively be referred to as dielectric material 310.

The preform 306 can include a divider 320.

In short, the preform 306 can facilitate routing of the cable 304 within the information handling system 202 (e.g., within a chassis of the information handling system 202). The cable 304 can be routed utilizing the preform 306. However, during routing of the cable 304 within the information handling system 202, the cable 304 can be bent (and further coupled to the preform 306) such that the dielectric materials 310 are compressed ("squeezed"). When the dielectric materials 310 are compressed, an impedance drop of the cable 304 occurs. To compensate for such an impedance drop of the cable 304 when the cable 304 is compressed, the cable 304 is coupled to the preform 306 such that the divider 320 is positioned between the dielectric materials 310. Positioning the divider 320 of the preform 306 between the dielectric materials 210 increases the distance between the conductors 308. When the distance between the conductors 308 is increased, the impedance of the cable 304 is increased, compensating for the drop in impedance when the cable 304 is compressed.

Figure 4:
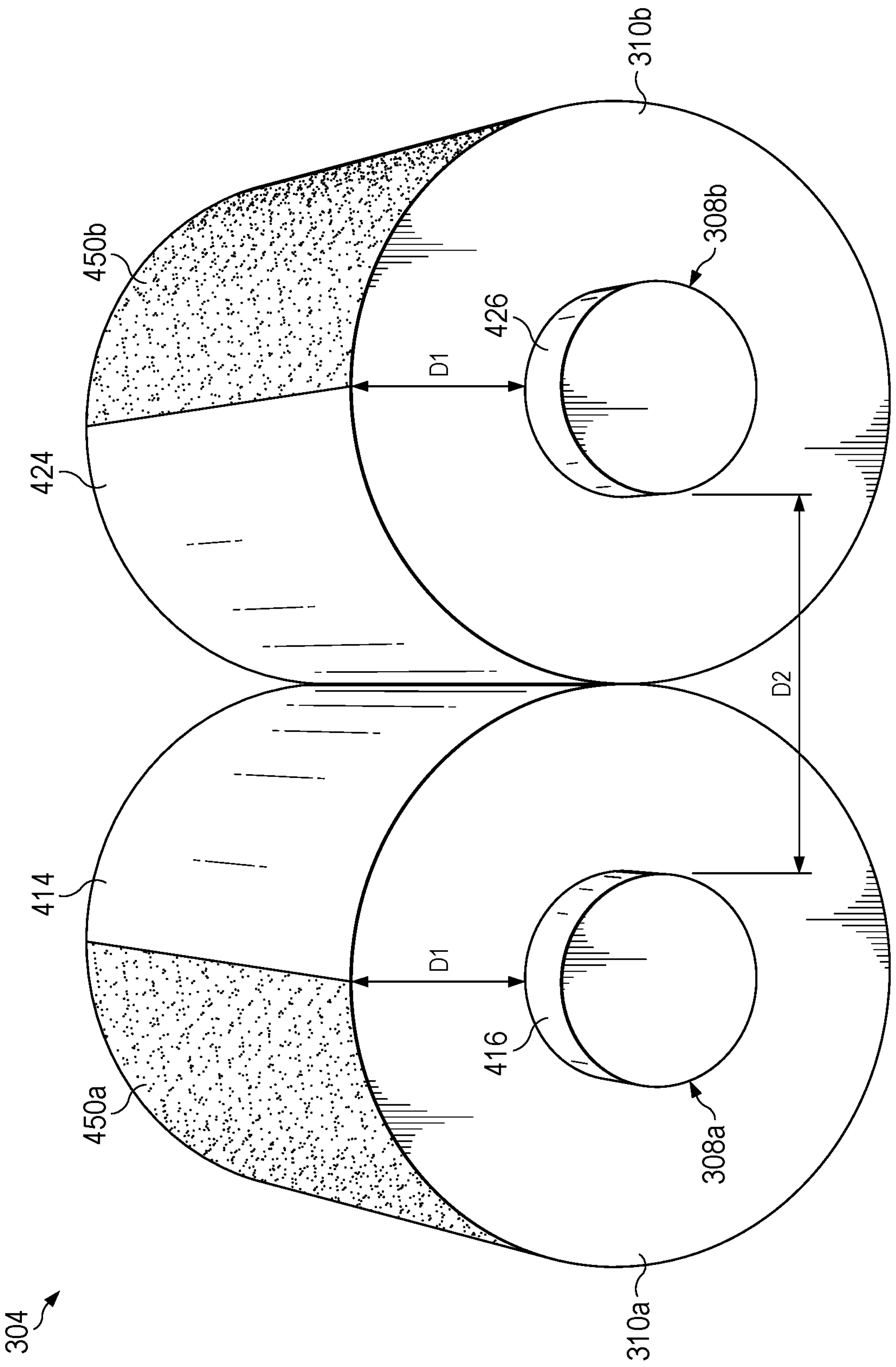
FIG. 4 illustrates a perspective view of the cable.

FIG. 4 illustrates a perspective view of the cable 304. The cable 304 includes the first conductor 308*a*, the second conductor 308*b*, the first dielectric material 310*a*, and the second dielectric material 310*b*. In some examples, the conductors 308 can be a differential pair of conductors. The first dielectric material 310*a* surrounds the first conductor 308*a*. The second dielectric material 310*b* surrounds the second conductor 308*b*.

To that end, when the cable 304 is in a first state, as shown in FIG. 4, an outer surface 414 of the first dielectric material 310*a* is spaced-apart from an outer surface 416 of the first conductor 308*a* a first distance D1. The first distance D1 is substantially constant between the outer surface 414 of the first dielectric material 310*a* and the outer surface 416 of the first conductor 308*a* around the first conductor 308*a* when the cable 304 is in the first state.

Moreover, when the cable 304 is in the first state, an outer surface 424 of the second dielectric material 310*b* is spaced-apart from an outer surface 426 of the second conductor 308*b* the first distance D1. The first distance D1 is substantially constant between the outer surface 424 of the second dielectric material 310*b* and the outer surface 426 of the second conductor 308*b* around the second conductor 308*b* when the cable 304 is in the first state. That is, the dielectric materials 310 are in contact with each other when the cable 304 is in the first state.

Moreover, when the cable 304 is in the first state, the outer surface 416 of the first conductor 308*a* is spaced-apart from the outer surface 426 of the second conductor 308*b* a second distance D2.

To that end, when the cable 304 is in the first state, the cable 304 can be associated with a first impedance. The first impedance of the cable 304 can be based on the first distance D1 and the second distance D2. That is, the first impedance of the cable 304 can be based on the distances between the conductors 308 and the respective outer surfaces of the dielectric materials 310, and a distance between the conductors 308 when the cable 304 is in the first state.

In some examples, a first conductive material 450*a* is coupled to the first dielectric material 310*a*. The first conductive material 450*a* can be coupled to the outer surface 414 of the first dielectric material 310*a* (away from the divider 320, shown in FIG. 4). The first conductive material 450*a* can be coupled to a portion of the first dielectric material 310*a*. Additionally, in some examples, a second conductive material 450*b* is coupled to the second dielectric material 310*b*. The second conductive material 450*b* can be coupled to the outer surface 424 of the second dielectric material 310*b* (away from the divider 320, shown in FIG. 4). The second conductive material 450*b* can be coupled to a portion of the second dielectric material 310*b*. To that end, the second conductive material 450*b* is coupled to the second dielectric material 310*b* opposite to the first conductive material 450*a* coupled to the first dielectric material

310*a*. That is, the portion of the second outer surface 424 that the second conductive material 450*b* is coupled to of the second dielectric material 310*b* is opposite to the portion of the first outer surface 414 that the first conductive material 450*a* is coupled to of the first dielectric material 310*a*. In some examples, the first conductive material 450*a* and the second conductive material 450*b* are conductive foil. In some examples, the first conductive material 450*a* and the second conductive material 450*b* are conductive paint.

The first dielectric material 310*a* and the second dielectric material 310*b* that do not include the conductive material 450*a*, 450*b*, respectively, are exposed between the conductors 308 such that there is electromagnetic (EM) coupling between the conductors 308.

Further, the areas where the dielectric materials 310*a*, 310*b* are located at the outer surface 414 of the first dielectric material 310*a* and the outer surface 424 of the second dielectric material 310*b*, respectively, are the areas where return currents of the cable 304 are most concentrated (compared to other areas of the cable 304).

To that end, the first dielectric material 310*a* is coupled to the second dielectric material 310*b*. Specifically, at least a portion of the first dielectric material 310*a* is coupled to at least a portion of the second dielectric material 310*b*. For example, along a length of the cable 304, at least a portion of the first dielectric material 310*a* is coupled to at least a portion of the second dielectric material 310*b*. For example, along a length of the cable 304, at least a portion of the first dielectric material 310*a* is coupled to at least a portion of the second dielectric material 310*b* via a webbing that connects the first dielectric material 310*a* to the second dielectric material 310*b*.

Figure 5:
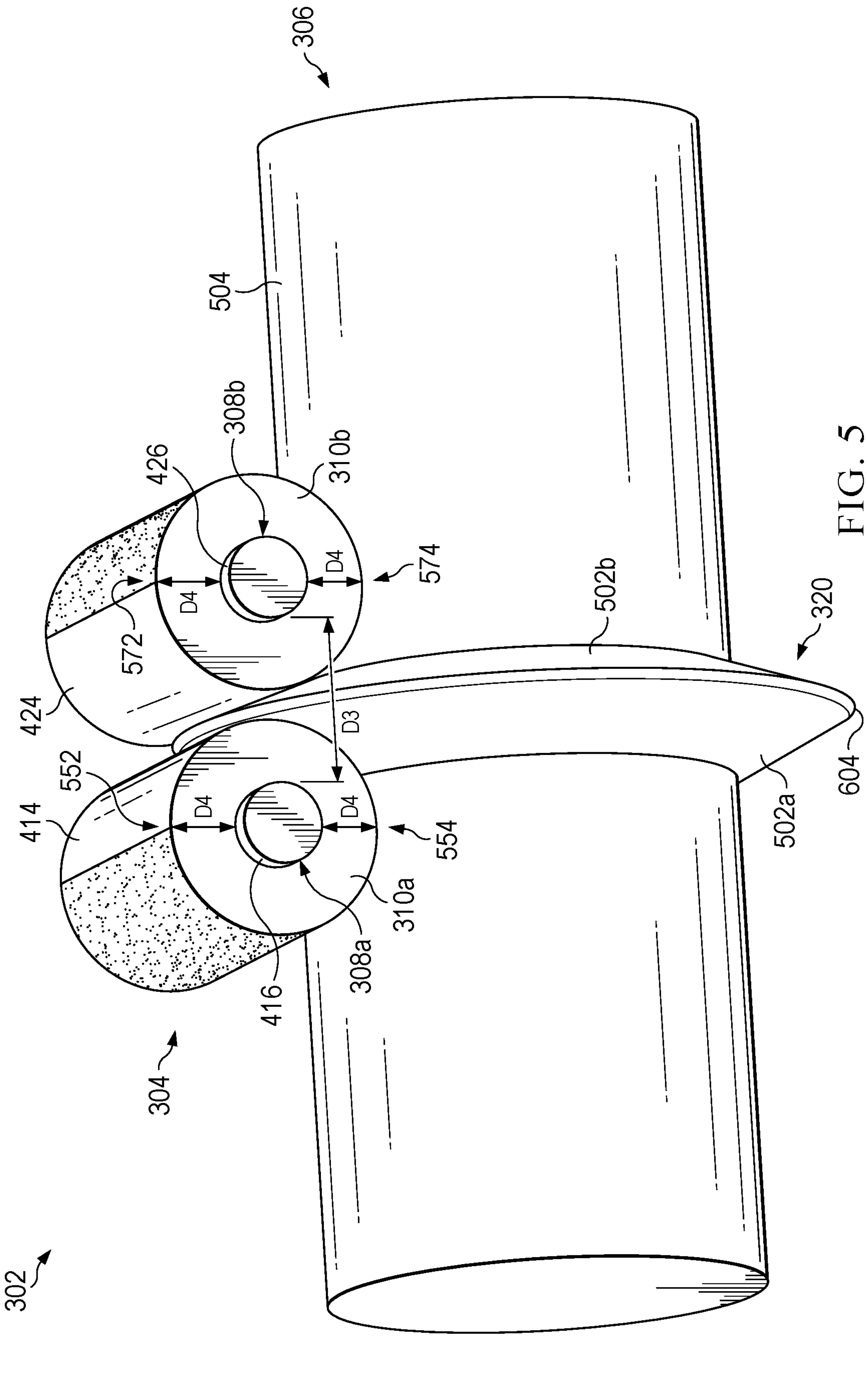
FIG. 5 illustrates a perspective view of the cabling system.

FIG. 5 illustrates a perspective view of the cabling system 302. The cabling system 302 includes the cable 304 and the preform 306. In some examples, the preform 306 can be cylindrical; however, the preform 306 can be any geometrical shape desired to facilitate appropriate routing of the cable 304 (e.g., within the information handling system 202).

The preform 306 includes the divider 320. The divider 320 can include a first member 502*a* and a second member 502*b* (collectively referred to as members 502). The members 502 can extend from a surface 504 of the preform 306. In some examples, when the preform 306 is cylindrical, the divider 320 can extend around a circumference of the preform 306. In some examples, the divider 320 extends around a portion of the circumference of the preform 306.

In some examples, when the preform 306 is cylindrical, the preform 306 has a radius. To that end, a bending radius of the cable 304, when coupled to the preform 306, is dependent on the radius of the preform 306 (at the preform 306). The radius of the preform 306 can have a magnitude to ensure a minimum bending radius of the cable 304.

Figure 6:
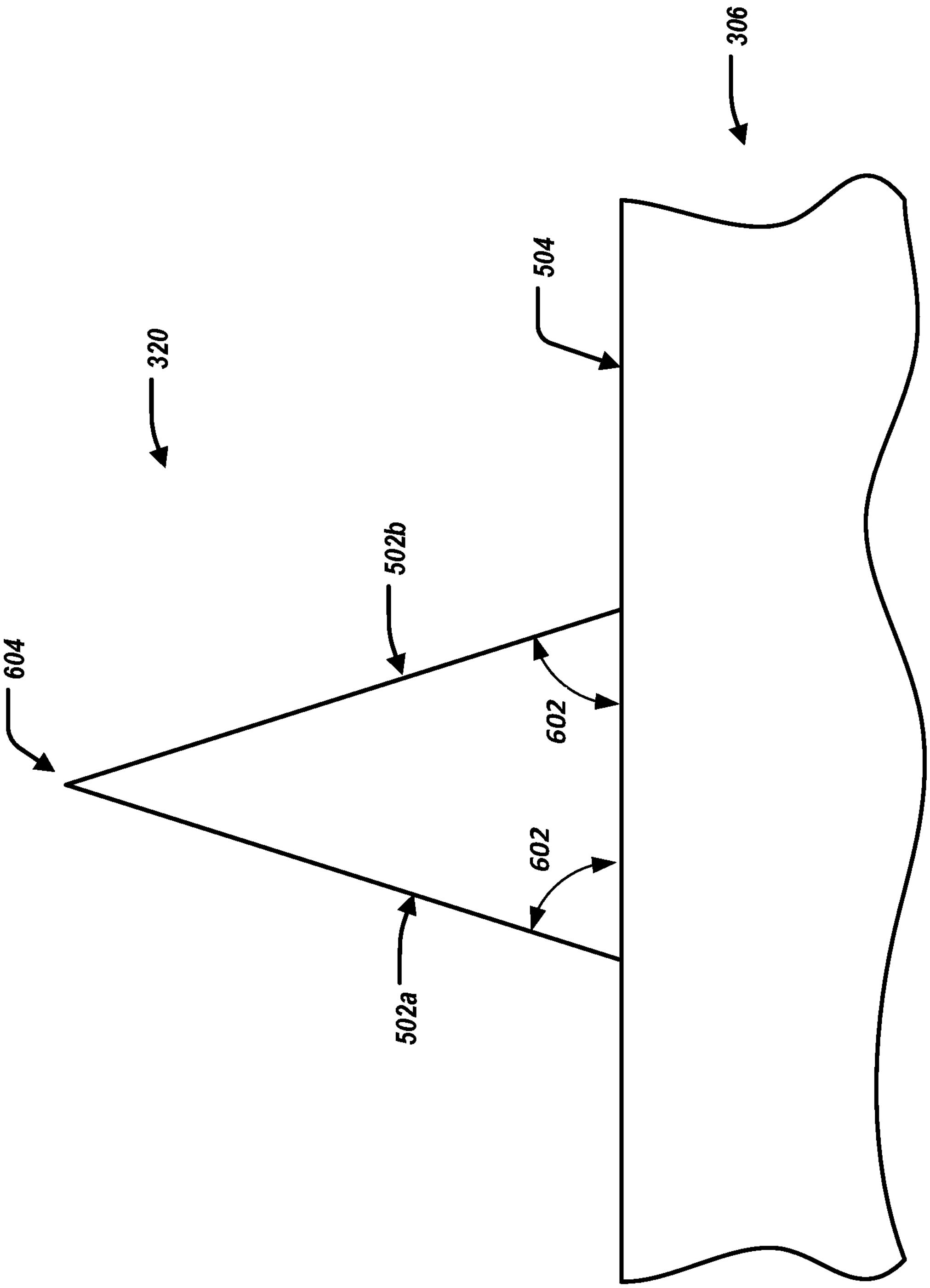
FIG. 6 illustrates a cross-section of a portion of a preform of the cabling system.

FIG. 6 illustrates a cross-section of a portion of the preform 306. The first member 502*a* can extend from the outer surface 504 at an angle 602 with respect to the outer surface 504. Furthermore, the second member 502*b* can extend from the outer surface 504 at the angle 602 with respect to the outer surface 504. The first member 502*a* is coupled to the second member 502*b* at a ridge 604 (or a vertex 604). In some examples, the first member 502*a* and the second member 504*b* can form a "wedge" based geometric shape (at the cross-sectional view). In some examples, the first member 502*a* and the second member 504*b* can form a triangle based geometric shape (at the cross-sectional view).

Referring to FIGS. 5 and 6, to that end, when the cable 304 is coupled to the preform 306, the divider 320 is positioned between the first dielectric material 310*a* and the second dielectric material 310*b*. Specifically, when the cable 304 is coupled to the preform 306, the divider 320 is positioned between the first dielectric material 310*a* and the second dielectric material 310*b* to place the cable 304 in a second state. The divider 320 defines the separation between the first conductor 308*a* and the second conductor 308*b* as a third distance D3.

Specifically, the cable 304 can be bent in the second state, and coupled to the preform 306. When the cable 304 is bent to place the cable 304 in the second state and coupled to the preform 306, the divider 320 can define the separation between the first conductor 308*a* and the second conductor 308*b* as the third distance D3.

When the cable 304 is in the second state, the outer surface 414 of the first dielectric material 310*a* is spaced-apart from the outer surface 416 of the first conductor 308*a* a fourth distance D4 at a first location 552 and a second location 554. The first location 552 is opposite to the second location 554. The fourth distance D4 is less than the first distance D1, shown in FIG. 4.

Moreover, when the cable 304 is in the second state, the outer surface 424 of the second dielectric material 310*b* is spaced-apart from the outer surface 426 of the second conductor 308*b* the fourth distance D4 at a first location 572 and a second location 574. The first location 572 is opposite to the second location 574.

Moreover, when the cable 206 is in the second state (bent) and coupled to the preform 306 such that the divider 320 is positioned between the first dielectric material 310*a* and the second dielectric material 310*b*, the outer surface 416 of the first conductor 308*a* is spaced-apart from the outer surface 426 of the second conductor 308*b* the third distance D3. The third distance D3 is greater than the second distance D2, shown in FIG. 4.

Specifically, the cable 304 can be bent (and further coupled to the preform 306) such that the first dielectric material 310*a* at the first location 552 and the second location 554 and the second dielectric material 310*b* at the first location 572 and the second location 574 is compressed. To compensate for an impedance drop of the cable 304 when the cable 304 is compressed, the cable 304 is coupled to the preform 306 such that the divider 320 is positioned between the first dielectric material 310*a* and the second dielectric material 310*b* to increase the distance between the conductors 308. That is, the divider 320 increases the distance between the conductors 308 such that the distance between the outer surface 416 of the first conductor 308*a* and the outer surface 426 of the second conductor 308*b* is increased from the second distance D2 (shown in FIG. 4) to the third distance D3 (shown in FIG. 5). When the distance between the conductors 308 is increased, the impedance of the cable 304 is increased, compensating for the drop in impedance when the cable 304 is compressed.

In some examples, the divider 320 defines the distance (the third distance D3) between the conductors 308. Specifically, the angle 602 that the members 502 extend from the outer surface 504 of the preform 306 can define the distance between the conductors 308. That is, a shallower angle 602 that the members 502 extend from the outer surface 504 of the preform 306 can further increase the distance between the conductors 308-*a* larger increase in distance between the conductors 308. A steeper angle 602 that the members 502 extend from the outer surface 504 of the preform 306 can increase the distance between the conductors 308 less than the increase between the conductors 308 when a shallower angle is used. In other words, the divider 320 increases the distance between the conductors 308, with a shallower angle 602 that the members 502 extend from the outer surface 504 of the preform 306 increasing the distance between the conductors 308 greater than a steeper angle 602 that the members 502 extend from the outer surface 504 of the preform 306.

In some examples, the angle 602 that the members 502 extend from the outer surface 504 of the preform 306 establishes the distance between the conductors 306 at the bending radius of the cable 304 (when coupled to the preform 306).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A cabling system, including:
a preform, including a divider;
a cable, including:
a first conductor;
a first dielectric material surrounding the first conductor;
a second conductor; and
a second dielectric material surrounding the second conductor;
wherein the first dielectric material is coupled to the second dielectric material,
wherein the cable is at least partially coupled to the preform such that the divider is positioned between the first dielectric material and the second dielectric material.

2. The cabling system of claim 1, wherein the preform is cylindrical.

3. The cabling system of claim 1, wherein the divider is positioned on an outer surface of the preform.

4. The cabling system of claim 3, wherein the divider includes:
a first member extending at an angle from the outer surface of the preform; and
a second member extending at the angle from the outer surface of the preform,
wherein the first member is coupled to the second member at a ridge.

5. The cabling system of claim 4, wherein the divider defines a distance between the first conductor and the second conductor.

6. The cabling system of claim 5, wherein the angle defines the distance between the first conductor and the second conductor.

7. The cabling system of claim 1, wherein the cable further includes:
a first conductive material coupled to a portion of a first outer surface of the first dielectric material; and
a second conductive material coupled to a portion of a second outer surface of the second dielectric material.

8. The cabling system of claim 7, wherein:
the second conductive material is coupled to the portion of the second outer surface of the second dielectric material opposite to the portion of the first outer surface of the first dielectric material that the first conductive material is coupled to.

9. The cabling system of claim 8, wherein the first conductive material and the second conductive material are conductive foil.

10. The cabling system of claim 8, wherein the first conductive material and the second conductive material are conductive paint.

11. An information handling system, comprising:
a processor;
memory media storing instructions executable by the processor to perform operations;
a cabling system, including:
a preform, including a divider;
a cable, including:
a first conductor;
a first dielectric material surrounding the first conductor;
a second conductor; and
a second dielectric material surrounding the second conductor;
wherein the first dielectric material is coupled to the second dielectric material,
wherein the cable is at least partially coupled to the preform such that the divider is positioned between the first dielectric material and the second dielectric material.

12. The information handling system of claim 11, wherein the preform is cylindrical.

13. The information handling system of claim 11, wherein the divider is positioned on an outer surface of the preform.

14. The information handling system of claim 13, wherein the divider includes:
a first member extending at an angle from the outer surface of the preform; and a second member extending at the angle from the outer surface of the preform, wherein the first member is coupled to the second member at a ridge.

15. The information handling system of claim 14, wherein the divider defines a distance between the first conductor and the second conductor.

16. The information handling system of claim 15, wherein the angle defines the distance between the first conductor and the second conductor.

17. The information handling system of claim 11, wherein the cable further includes:

a first conductive material coupled to a portion of a first outer surface of the first dielectric material; and a second conductive material coupled to a portion of a second outer surface of the second dielectric material.

18. The information handling system of claim 17, wherein:

the second conductive material is coupled to the portion of the second outer surface of the second dielectric material opposite to the portion of the first outer surface of the first dielectric material that the first conductive material is coupled to.

19. The information handling system of claim 18, wherein the first conductive material and the second conductive material are conductive foil.

20. The information handling system of claim 18, wherein the first conductive material and the second conductive material are conductive paint.

* * * * *